(12) United States Patent
Kobussen et al.

(10) Patent No.: US 6,245,369 B1
(45) Date of Patent: Jun. 12, 2001

(54) METHOD AND MEANS FOR CONTROLLING THE VARIATIONS IN WEIGHT OF EXTRUDED SAUSAGES

(75) Inventors: Mart Kobussen; Jos Kobussen, both of Indianola, IA (US); Jaap Kobussen, Veghel (NL); David L. Davison, Norwalk, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/508,614

(22) PCT Filed: Jul. 14, 1999

(86) PCT No.: PCT/US99/15914

§ 371 Date: Mar. 13, 2000

§ 102(e) Date: Mar. 13, 2000

(87) PCT Pub. No.: WO00/03603

PCT Pub. Date: Jan. 21, 2000

(51) Int. Cl.[7] .............................. A22C 11/00; A23P 1/00; B28B 17/00
(52) U.S. Cl. ........................ 426/231; 425/140; 425/141; 426/513; 452/31; 452/37
(58) Field of Search .................................. 426/231, 513; 452/37, 30, 31; 425/140, 141

(56) References Cited

U.S. PATENT DOCUMENTS

| | | | |
|---|---|---|---|
| 4,434,529 | 3/1984 | Jensen | 452/37 |
| 5,743,792 | 4/1998 | Hanten et al. | 452/37 |
| 5,843,504 | * 12/1998 | Kobussen et al. | 426/513 |
| 6,054,155 | * 4/2000 | Kobussen et al. | 426/513 |

FOREIGN PATENT DOCUMENTS

| | | |
|---|---|---|
| WO 96/05733 | 2/1996 | (WO) . |
| WO 98/17119 | 4/1998 | (WO) . |
| WO 99/13730 | 3/1999 | (WO) . |

* cited by examiner

*Primary Examiner*—George C. Yeung
(74) *Attorney, Agent, or Firm*—Zarley, McKee, Thomte, Voorhees & Sease

(57) ABSTRACT

A conveyor assembly for moving an extruded strand of sausage (26) from an extruding machine (10) and for coagulating the outer surface (28) of the strand (26) has first (48) and second (49) conveyor elements mounted on a frame (36). The conveyor assembly on the frame (36) moves from a point of beginning (38) to a discharge station (40) and thence back to the point of beginning (38). A brine fluid circuit is disposed on the frame above the conveyor with a plurality of discharge nozzles thereon to spray brine on a strand of sausage moving with the conveyor assembly. A pair of laser lights (88) project beams (90) on the unlinked strand (26) to determine the diameter thereof. A signal is sent from the lasers to a controller (92) who compares the diameter of the strand to a predetermined diameter. The controller controls a meat emulsion pump (14) and causes it to increase or decrease its meat discharge rate to compensate for variations in diameter, and hence weight, between the measured strand and the predetermined strand on file in the controller.

30 Claims, 6 Drawing Sheets

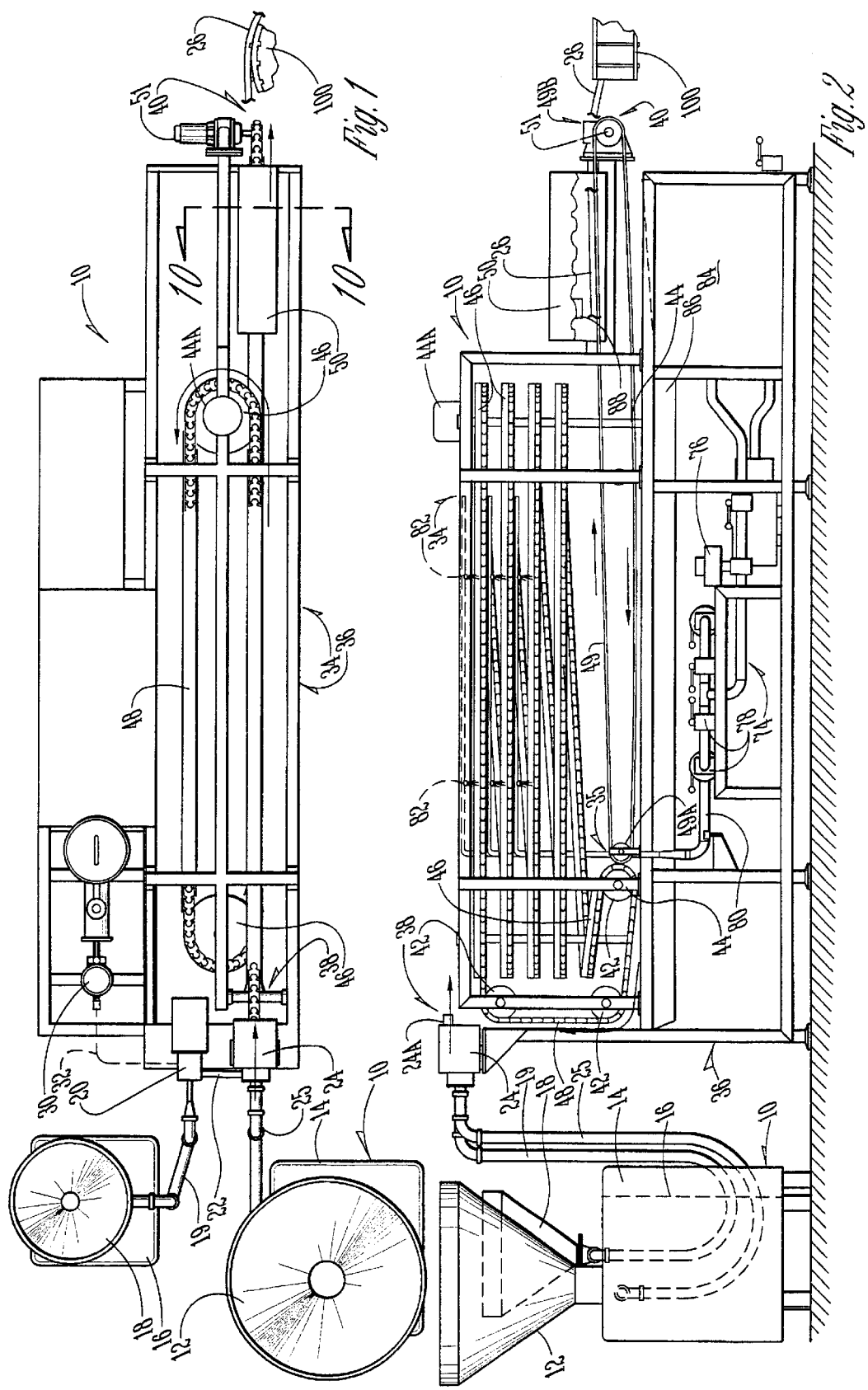

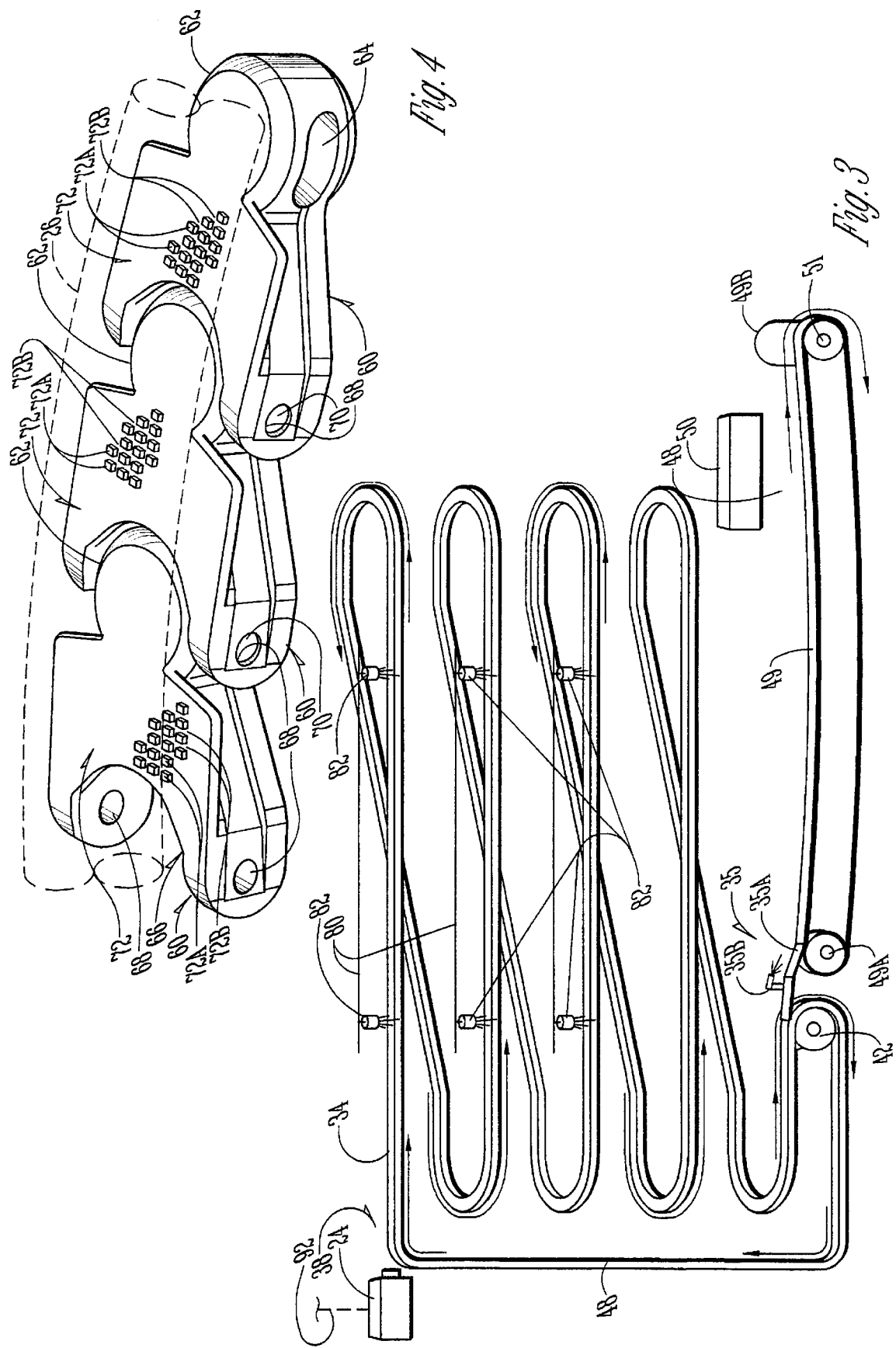

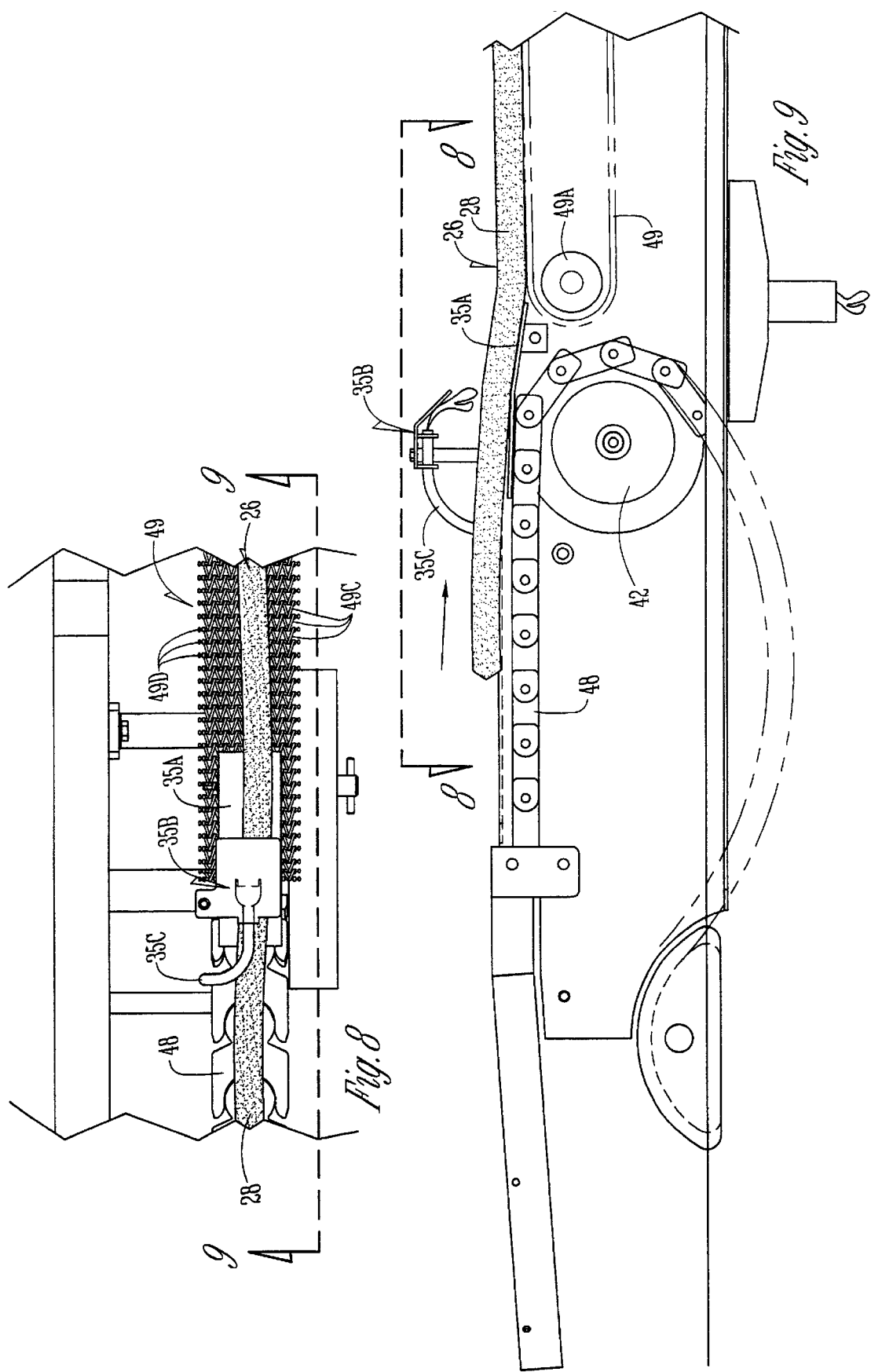

METHOD AND MEANS FOR CONTROLLING THE VARIATIONS IN WEIGHT OF EXTRUDED SAUSAGES

BACKGROUND OF THE INVENTION

In recent times, it has become known to coextrude a strand of sausage material which has an inner core of meat emulsion having an outer surface material that can be coagulated to provide an encasement for the strand. The coagulation normally includes subjecting the extruded strand to a brine solution. The brine is applied immediately after the strand is extruded.

The brine is sometimes sprayed onto the sausage strand as the strand is moved along an elongated conveyor which is comprised of a plurality of pivotally interconnected links. Weight control in these processes is largely dependent upon the accuracy of the meat supply. Such coextrusion systems are therefore often equipped with metering pumps to ensure such accuracy. However, intermittent checks of sausage weights are still often required. Such checks are simply done by weighing one or more sausages as they come crimp/cut or linked from the linking device. When the weight is off target, the operator may adjust the meat-flow accordingly. This is more often the case with instable meat-doughs; those are meat formulations which in time differ in consistency. For instance English breakfast sausage meat formulations contain rusk. Rusk is an important ingredient comparable to breadcrumbs. When freshly mixed an English breakfast sausage meat-dough is fairly fluid. Gradually rusk starts to bind the free water in the dough causing the viscosity to rise. Most meat supply systems in use today are vulnerable for such viscosity changes, in the sense that they give various meat outputs. It is therefor common practice to check and balance the weight consistency of such sausage processes. This is true for common sausage casing stuffing, as well as for coextrusion processes.

Recently developments in sausage coextrusion technology have led to coextrusion processes where the brine treatment is prolonged in time. Older processes have brine dwell times of between 1 and 5 seconds. Newer processes have brine times of 30 to 90 seconds or more, depending on sausage end-product requirements. Several advantages over the older methods are obtained by prolonged brine times, however the practice of check and balance of the weight consistency is more difficult. The weight of individual sausages in these processes can only be determined after the coextruded sausage strand is crimped/cut or linked in the linking device. When brine times are for instance 60 seconds, at a common coextrusion speed of 100 cm per second, there are 60 meters of sausage already coextruded. If the check after the linking device dictates a change in meat flow, 60 meters of sausage is already off weight. Compared to the older methods, these new methods have therefor a worse weight control.

It is therefore a principal object of the present invention to provide a method for manufacturing co-extruded food strands with an edible casing in which the previous problems and disadvantages of the known co-extrusion methods do not occur.

It is a further object of the present invention to provide a novel method for reducing the weight variation of co-extruded sausages.

An additional object of the present invention is to create by co-extrusion a substantially uniform layer of a collagen containing gel around an elongated strand of foodstuff, coagulating said foodstuff by contacting it with a salt containing brine, and determining the weight variation accuracy after said co-extrusion but before linking of the coextruded sausage strand.

These and other objects will become clear from the following description of the present invention.

SUMMARY OF THE INVENTION

The sausage strand is extruded onto a belt or conveyor and carried through a brine shower system for about 40 seconds. The brine is sprayed through nozzles onto the sausage while traveling on the belt. The conveyor is comprised of a plurality of links which have a flat supporting surface interrupted by a plurality of spaced protrusions which channels therebetween to permit brine to fill the channels and to engage the bottom surface of the sausage strand supported on the protrusions.

The belt is a Multi-Flex chain made from Acetal plastic. The links are secured with stainless steel pins. Twenty four meters of belt running on four tiers provide the brine shower dwell time that is required. The improvement of this invention is the method of producing a co-extruded sausage strand, characterized by determining the weight consistency of said strand before linking said strand of coextruded sausage.

BRIEF DESCRIPTION OF THE DRAWINGS

FIG. 1 is a plan view of the sausage extruder unit and the associated conveyor;

FIG. 2 is a side elevational view thereof as viewed from the bottom of FIG. 1;

FIG. 3 is a schematic view of the conveyor unit;

FIG. 4 is an enlarged scale perspective view of the conveyor belt;

FIG. 8 is an enlarged scale partial plan view taken on line 8—8 of FIG. 9;

FIG. 9 is a partial enlarged scale side elevational view taken on line 9—9 of FIG. 8;

DESCRIPTION OF THE PREFERRED EMBODIMENT

The term "sausage" as used herein refers to any type of emulsified meat product that is formed into sausage or frankfurter links or the like. A description of the machine upon which this invention is practiced will first be provided. Most of the machine does not of itself comprise the invention herein.

Figure 5:
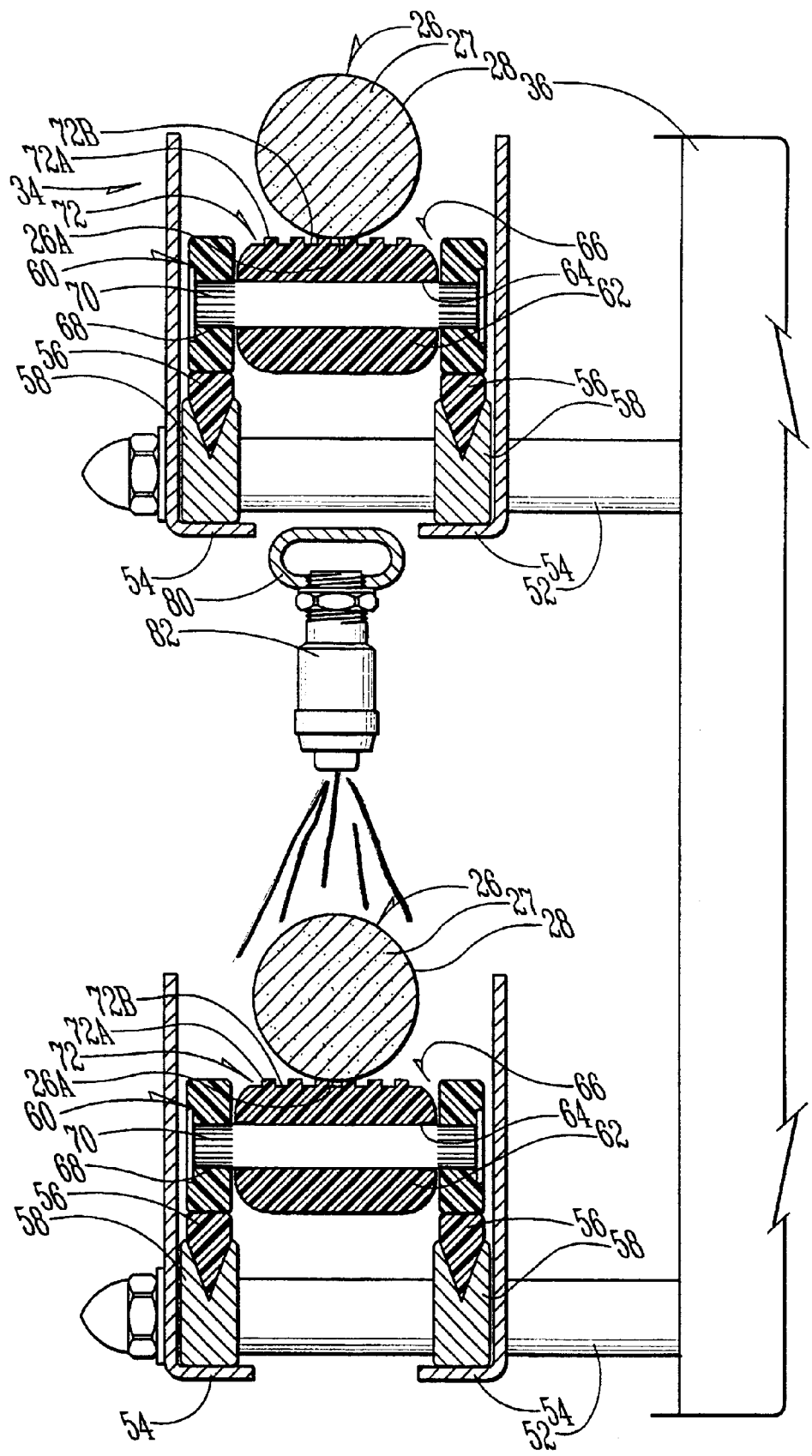
FIG. 5 is an enlarged scale sectional view taken on line 5—5 of FIG. 1.
Figure 6:
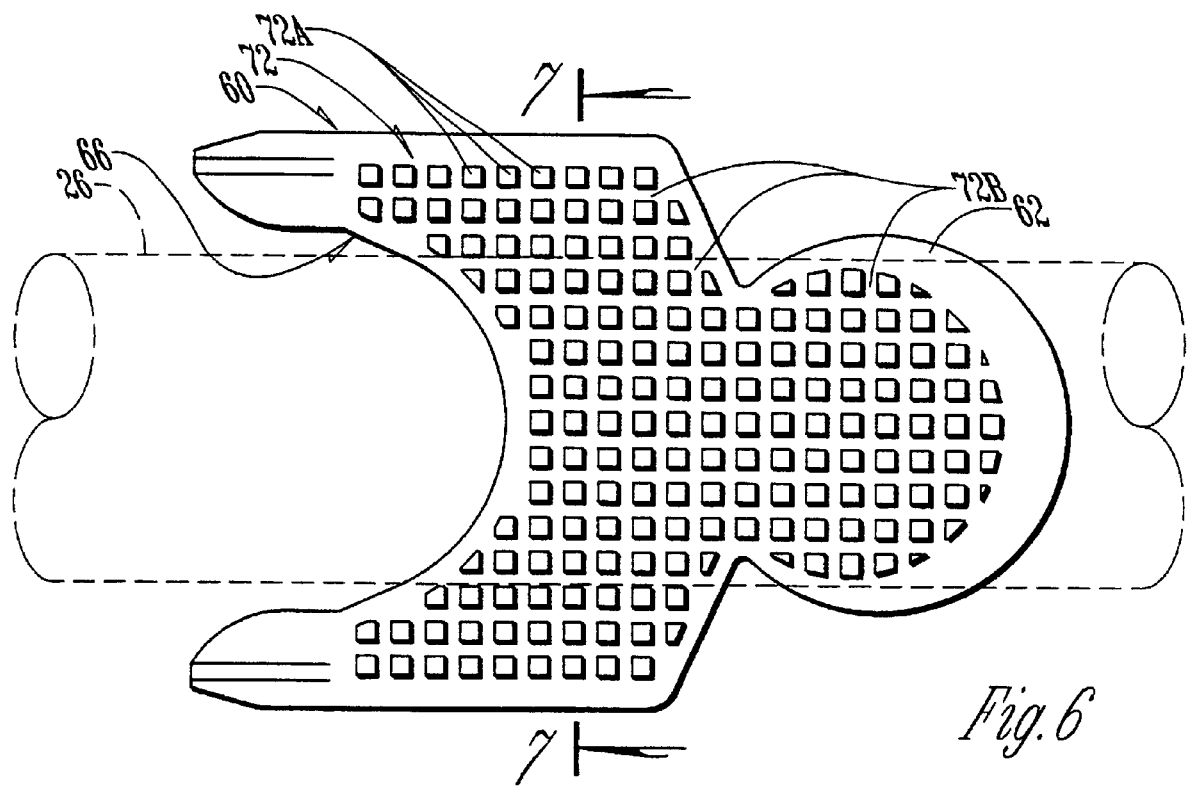
FIG. 6 is an enlarged scale plan view of a conveyor link.
Figure 7:
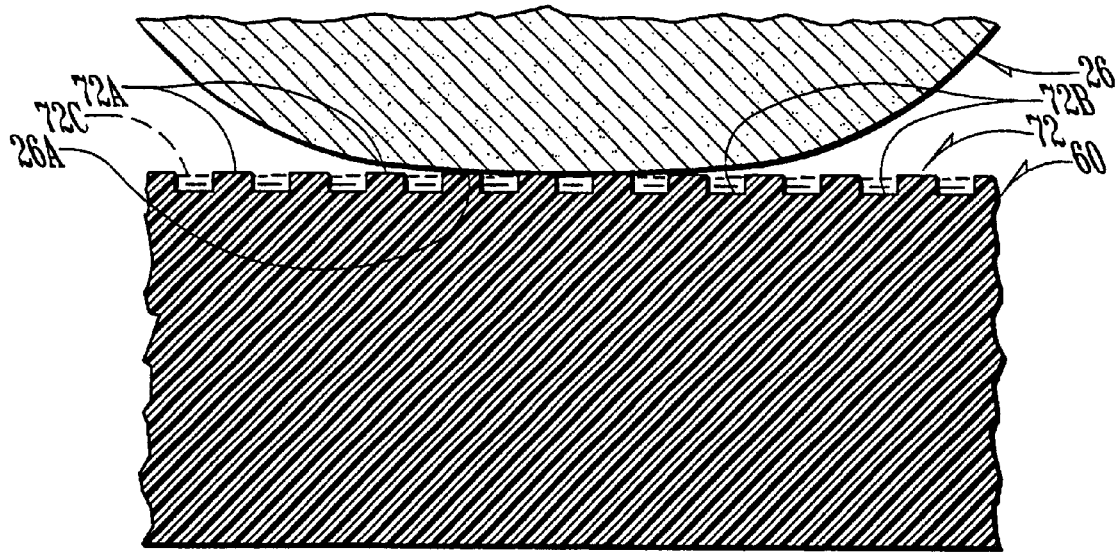
FIG. 7 is a sectional view on line 7—7 of FIG. 6.

The numeral 10 designates an existing coextruding machine suitable for the conveyor of this invention. The numeral 12 is a meat emulsion hopper using a meat pump machine 14 for pumping emulsified meat. A collagen gel pump 16 has a hopper 18 for receiving the collagen gel. It is connected by conduit 19 to inline mixer 20. A tube 22 connects the inline mixer 20 to the coextruder 24 which is capable of extruding a cylindrical strand of meat emulsion with a collagen gel material on the outer surface thereof. Coextruder 24 with detachable nozzle 24A is connected by tube 25 to the meat pump 14. The conventional coextruded strand of sausage 26 (FIGS. 5, 8, and 9) has an emulsified meat material core with the collagen gel comprising the outer surface 28 thereof. Liquid smoke from liquid smoke dispenser 30 is used as a coagulation material to coagulate the outer surface 28 of sausage strand 26. The liquid smoke dispenser 30 can be connected in any convenient way such as by line 32 to the inline mixer 20 (FIG. 1).

A conveyor system 34 is mounted on frame 36 and has a point of beginning 38 adjacent the output end of coextruder 24, and a discharge station 40 which is located outwardly and downwardly from the point of beginning 38. Three sprockets 42 are rotatably mounted on frame 36 and are adapted to rotate about a horizontal axis. As best shown in FIG. 2, two of the sprockets 42 are vertically disposed with respect to each other below point of beginning 38, and the third sprocket 42 is located on the outer end of a conveyor system 34 adjacent intermediate discharge station 35.

Two vertical shafts 44 are mounted on opposite ends of frame 36. Each shaft 44 has five rotatably disposed sprockets 46 thereon which are adapted to rotate on shafts 44 about the vertical axis of the shafts. Each set of five sprockets 46 are located in the same parallel plane as one each of the sprockets on the opposite vertical shaft 44. One of the shafts 44 can be driven by motor 44A (FIGS. 1 and 2). An endless conveyor 48 is circuitiously mounted on the sprockets 42 and 46.

A second conveyor 49 (FIGS. 8, 9) is rotatably mounted on sprockets 49A and 49B (FIG. 2). Sprocket 49A is adjacent to and below sprocket 42 in intermediate discharge station 35. Conveyor 49 (FIG. 8) is comprised of a plurality of corrugated parallel wires 49C interconnected by pivot rods 49D. It is seen that conveyor system 34 includes conveyors 48 and 49.

At the intermediate discharge station 35, a ramp plate 35A (FIG. 9) is secured to the machine 10 and extends over the conveyor 48 and sprocket 42, and thence extends slightly downwardly towards the top of conveyor 49. A water nozzle 35B is mounted over ramp plate 35A and is connected to a source of fresh water (not shown) by tube 35C to spray fresh water on strand 26.

An inverted v-shaped frame 50 is mounted on frame 36 adjacent discharge station 40. A drive 51 shaft for the conveyor 49 is located adjacent the discharge station 40 as best shown in FIGS. 1 and 2.

Conveyor 48 (FIG. 5) is disposed between a plurality of elongated L-shaped guides 54 which are secured to frame 36. Elongated rails 56 mounted on bearings 58 extend longitudinally through the guides. With reference to FIG. 4, the conveyor 48 is comprised of a plurality of conveyor segments or links 60 which each have a circular male member 62 at one end thereof with a laterally extending connection slot 64. A semi-circular female slot 66 appears at the end of segment 60 opposite to circular male member 62. Laterally extending apertures 68 extend through the semi-circular female slot 66. Laterally extending pins 70 extend through the aperture 68 and thence through the slot 64 to interconnect the belt segments 60. The apertures 28 permit the segment 60 to pivot about the longitudinal axes of aperture 68, and the slot 64 permits the segments 60 to have limited pivoted movement about a vertical axis passing through the slot 64 so that the conveyor 48 can reverse its direction of travel around sprockets 46. The center portion of each segment 60 is comprised of a flat supporting surface 72 which is in the same plane as the upper surfaces of the circular male member 62 and the body of the segment surrounding the female slots 66. The support surface 72 has a plurality of projections 72A which are preferably aligned in rows to create channels 72B therebetween. The projections 72 are approximately 0.063 in. square, and 0.045 inches high, thus making channels 72B 0.063 in. wide and 0.045 inches deep. A strand 26 one inch in diameter usually will have its lower surface 26A touching 4–6 members 72A and will span 4–6 channels 72B. When the channels 72B are filled with brine, the brine 72C in the channels will engage the bottom surface 26A of sausage strand 26.

With reference to FIG. 2, a brine circuit system 74 includes a brine pump 76. A plurality of miscellaneous control valves 78 are imposed in the brine circuit 74 to selectively control the flow of brine through the system. A fluid line 80 extends from pump 76 and includes a plurality of spaced nozzles 82 which, as discussed hereafter, are located in a plurality of locations on frame 36 directly above the conveyor 48 (see FIG. 5) to dispense a spray of fluid brine on the strand of sausage 26.

Brine circuit 74 includes a brine tank 84 which is connected to a brine collection tray 86 located below the various tiers of conveyor 48, and below conveyor 45.

In operation, the meat emulsion hopper 12 is charged with a supply of meat emulsion, and the collagen hopper 18 is charged with a quantity of collagen gel. Similarly, the liquid smoke dispenser 30 is charged with liquid smoke so that the liquid smoke is combined with the collagen gel within inline mixer 20.

The mixture of liquid smoke and collagen gel is transmitted through tube 22 to coextruder 24 which conventionally discharges the sausage strand 26 with the center core of meat emulsion and an outer surface 28 comprised of the collagen gel and liquid smoke. The liquid smoke is adapted to coagulate the collagen gel in the presence of air and a brine solution. The strand of sausage 26 is discharged from extruder 24 onto the point of beginning of the conveyor 34. The sausage strand progresses along the moving conveyor 48 of the conveyor 34 and is moved under a plurality of the nozzles 82 which spray a quantity of brine on the moving sausage strand. The brine-filled channels 72B help the brine to engage the bottom surface 26A of the strand.

Figure 10:
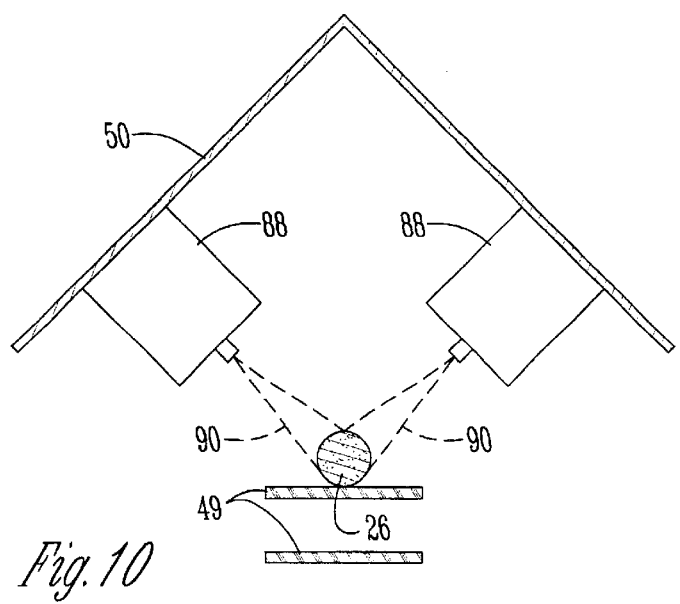
FIG. 10 is an enlarged scale sectional view taken on line 10—10 of FIG. 1.
Figure 11:
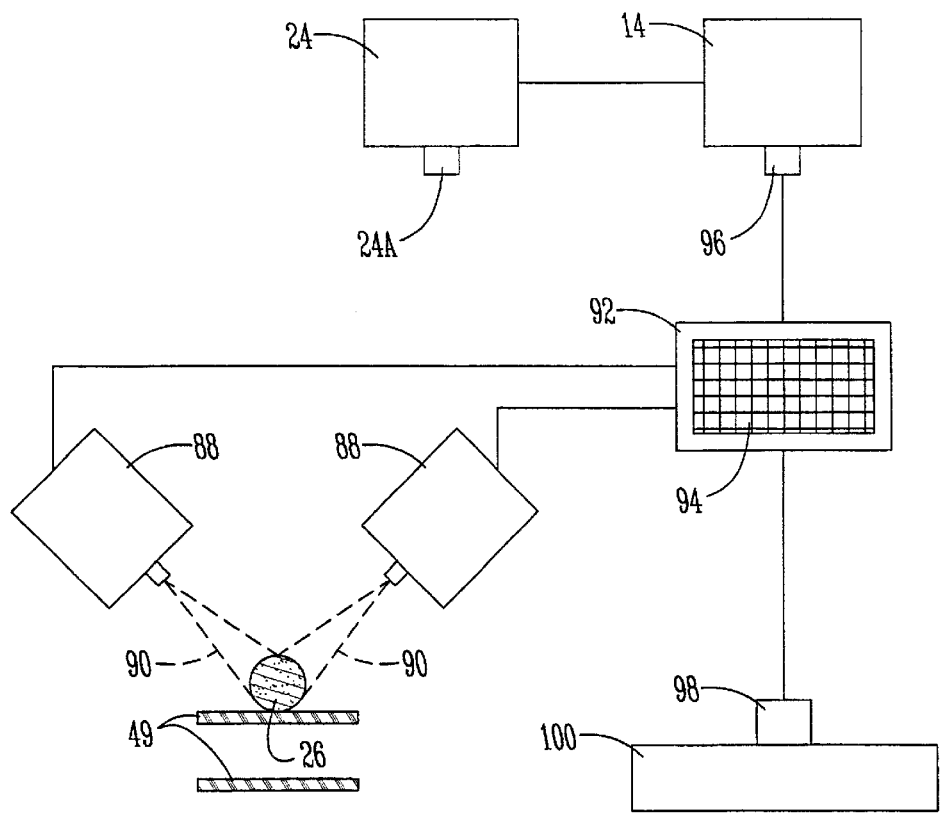
FIG. 11 is a schematic view of the sensor system.

The following structure deals primarily with the instant invention. A pair of laser light emitters 88 (FIG. 10) are secured to frame 50 adjacent conveyor discharge end 40 and emit blade shaped beams 90 downwardly and inwardly towards the strand 26 which has a coagulated outer surface 28. The beams 90 together span at least 120° of the circumference of the strand and communicate electronic signals to controller 92 (FIG. 11) which converts the signals into a cross-sectional diameter of the strand 26. The controller 92 is programmed to know the size (diameter) of the nozzle 24A being used in extruder 24 through manual engagement of a conventional touch screen 94 on the controller. Since the density of the strand is essentially constant, any variations in the diameter of the strand 26 are directly proportional to the weight or density of the strand per unit length. Thus, if the nozzle 24A is 10 mm in diameter, the controller 92 from the signal provided by lasers 88 will advise the controller 92 of any variations in the diameter of the strand 26 at the discharge end 40 of the conveyor 49. If the sensed diameter of the strand 26 has decreased, (such as by stretching of the strand), this decrease will be sensed by the controller 92 as described above. An electronic signal will be sent from the controller 92 to the power input motor 96 of pump 14 to increase the output of meat emulsion to extruder 24. This will cause the diameter, and hence the weight, of the finished strand 26 at bushing end 40 to be increased commensurate with a predetermined diameter of a known weight consistent with the 10 mm nozzle being used in that program. The above procedure is reversed if the sensed diameter of the strand at end 40 is oversize.

The controller 92 may be comprised of one or more computers wherein a first computer performs the mathematics from the signals received from the sensors 88 to calculate the diameter of the sensed strand. The first computer can then transmit the measured diameter data to the second computer for comparison to predetermined diameter data, whereupon the second computer can exercise control over the pump speed, as required, to compensate for diameter variations. If desired, the second computer can respond to average measured diameter readings, rather than individual readings, whereupon the second computer will respond to average measured readings rather than individual readings. The lasers 88, for example, can receive measured diamenter data from a strand of up to 50 scans per second over a 40 second period, if average diameters were to be used.

The controller 92 is also operationally connected to the motor 98 of linker 100 which receives the strand 26 as it leaves conveyor end 40. The controller 92 operates the linker 100 at constant speed for a given nozzle 24A, and automatically increases the rotational speed of linker motor 98 and pump motor whenever the touch screen 94 is notified manually that a nozzle of different diameter is being used with extruder 24.

The foregoing phenomenon is known generally as "machine visioning" or "machine vision technology". See, e.g., U.S. Pat. Nos. 5,351,078; 5,249,045; 5,283,641; 5,119,190; 5,067,012; 4,984,073; 4,929,029; and 4,148,061.

The controller 92 coordinates the speed of the rate of discharge of the strand of sausage 26 with the longitudinal movement of the conveyors 48 and 49 as dictated by motor 44A and the conveyor drive 51 so that the elongated strand will normally not be stretched during its movement.

The excess brine from nozzles 82 flows downwardly into the brine collection tray 86, and thence into brine tank 84 wherein the excess brine is recirculated through the system.

The controller 92 is also adapted to cause the strand of sausage 26 to move from the point of beginning 38 to the intermediate discharge station 35 in approximately 40 seconds to permit the brine sufficient time to coagulate the outer surface 28 of the sausage strand 26.

When the strand 26 reaches intermediate discharge station 35, it is very moist from the brine solution. It moves over ramp plate 35A (FIG. 9) and underneath fresh water nozzle 35B, and thence onto open wire conveyor 49. The residual brine on the strand is washed away by the fresh water, and all the water thereon flows by gravity from the strand downwardly through the openings between the corrugations in corrugated wire 49C in conveyor 49 for deposit in tray 86.

When the sausage strand 26 reaches the discharge station 40, the outer surface 28 is sufficiently coagulated to provide strength to the sausage strand where it is received by linker 100 where it is formed into a plurality of lengths at that location.

The present invention provides a process for coagulating co-extruded collagen containing gel surrounding an edible food stuffs, i.e. sausages. Co-extrusion methods are mainly being used for co-extrusion of sausage or sausage like materials. While the instant process relates particularly to the manufacturing of sausages, it may also be used in the production of other collagen coated foodstuffs, such as fish or meat products containing vegetable or cheese or both. The term "sausage" as used herein refers to any type of emulsified food product that is formed into sausage or frankfurter links or the like.

The invention is not limited to collagen coated foodstuffs, but may also be applied for co-extruding foodstuffs with a different kind of coating material such as casein, soy, wheat, cellulose, alginate, chitosan or starch based gels.

The present invention holds the concept of determining the weight consistency of the coextruded sausage strand, right after point of extrusion, before the point of linking the sausage strand. In this manner corrections to the meat supply may be taken earlier than after the weighing of individual sausages after the linking step. This concept is particularly useful if the outcome the weight check is automatically translated in meat supply changes, by having the weigh determining device be in direct communication with the meat supply system.

One preferred method of determining the weight accuracy of the coextruded sausage strand is to have weight sensing means installed after the coextuder which can intermittently determine the weight of a set length of sausage. For instance one meter of the continuous sausage strand may be weighed every 2 seconds, right after the coextruder, as it moves along into its path through the brine dwell system. An electronic program can than translate weight variation, into commands towards the meat supply system to secure a weight consistent sausage output.

Such electronic program may be likewise used for a second preferred method, by which the weight consistency determination, is accomplished by determining the sausage strand diameter consistency. In this method an electronic sensing means is employed (an electronic eye or laser beams 90) to measure the diameter of the sausage strand as it exits the coextruder. The sausage strand outer volume or its diameter is in direct correlation with its weight, therefor diameter changes to the coextruded sausage strand can be measured and translated into commands to the meat supply system (e.g., pump 14).

It is therefore seen that the conveyor system of this invention will achieve at least its principal objectives.

What is claimed is:

1. A method of producing an extruded sausage, comprising the steps of extruding a strand of unlinked sausage by means of a pump, sensing the weight per unit length of the strand by sensing the outside diameter thereof, comparing the sensed diameter to that of a strand having a predetermined diameter and predetermined weight per unit length, determining any plus or minus variance between the measured diameter and increasing or decreasing, respectively, the rate of discharge of sausage by the pump to adjust the diameter of a subsequently extruded strand to that of a strand having the predetermined diameter.

2. The method of claim 1 wherein the sensing step is accomplished by means of at least one sensor laser.

3. The method of claim 1 wherein the sensing step is accomplished by means of at least a pair of laser sensors.

4. The method of claim 3 wherein the sensors emit a planar beam of light towards the strand.

5. The method of claim 4 wherein the planar beam of light intersects at least 120° of the circumference of the strand.

6. The method of claim 1 wherein the strand is formed into a plurality of elongated links after the sensing has taken place.

7. A method of producing a co-extruded sausage, comprising the steps of, co-extruding a strand of unlinked sausage by means of a pump, the co-extruding including co-extrusion of a casing forming material around a strand of meat material, coagulating the casing forming material, determining the weight per unit length of the co-extruded strand after the step of coagulating, and thence, linking the strand into a plurality of links, sensing the weight per unit length of the strand by sensing the outside diameter thereof, comparing the sensed diameter to that of a strand having a predetermined diameter and predetermined weight per unit length, determining any plus or minus variance between the measured diameter and increasing or decreasing, respectively, the rate of discharge of sausage by the pump to adjust the diameter of a subsequently extruded strand to that of a strand having a predetermined diameter.

8. The method of claim 7 wherein the strand is moved through a coagulation station after extrusion, and then has its diameter sensed.

9. A method for producing co-extruded sausage including the steps of co-extruding a layer of casing forming material around a strand of meat material to form a strand of sausage, coagulating said casing forming material and linking said strand of sausage, the method further including the step of determining the weight consistency of said strand of sausage before said linking.

10. A method according to claim 9 wherein the determining of weight consistency being performed with the use of measuring means to determine the diameter of said strand of sausage.

11. A method according to claim 2 wherein the use of electronic vision technology to determine the diameter of said strand of sausage.

12. A method according to claim wherein said assessment of weight consistency being performed with the use of sensing means to determine the weight of a predefined length of sausage.

13. The method according to claim 1 wherein data from said weight sensing step is communicated to pumping equipment of said sausage supply, as to automatically vary said equipment setting to obtain low weight variation of said strand of sausage.

14. The method according to claim 1 wherein said co-extruded strand of sausage being set in contact with a salt containing solution for a period longer than 3 seconds prior to said linking.

15. The method according to claim 1 wherein said co-extruded sausage being English breakfast sausage.

16. The method according to claim 15 wherein said sausage contains rusk.

17. An apparatus for producing co-extruded sausage comprising a co-extruder having an infeed and outfeed end, a supply of casing forming material and a supply of foodstuff connected to said infeed end to form a strand of co-extruded sausage from said outfeed end, and having means to determine weight consistency of said strand of co-extruded sausage close to said outfeed end.

18. The method according to claim 9 wherein said step to assess weight consistency includes equipment to determine the diameter of said co-extruded sausage strand.

19. The method according to claim 9 wherein said step to assess weight consistency includes equipment to determine the weight of a predefined length of said co-extruded sausage strand.

20. The method according to claim 9 wherein said step to assess weight consistency includes output data in communication with pumping equipment for a supply of the sausage strand as to automatically vary said equipment setting to obtain low weight variation of said co-extruded sausage strand.

21. The method of claim 7 wherein the sensing step is accomplished by means of at least a pair of laser sensors.

22. The method of claim 21 wherein the sensors emit a planar beam of light towards the strand.

23. The method of claim 22 wherein the planar beam of light intersects at least 120° of the circumference of the strand.

24. The method of claim 7 wherein the strand is formed into a plurality of elongated links after the sensing has taken place.

25. An apparatus for producing co-extruded sausage, comprising, a coextruder for extruding a sausage strand having an inner core and a casing forming material on the outer surface thereof, a meat pump means connected to the co-extruder and a source of sausage material and casing forming material, a conveyor downstream from the co-extruder to receive the extruded sausage strand, and having a discharge end, means on the conveyor for providing a coagulation solution to the extruded strand, a sensor means adjacent the discharge end of the conveyor for determining the weight per unit length of the sausage strand, controller means connected to the sensor means for comparing the measured weight of the strand to a predetermined desired weight, the controller being operationally connected to the pump means to adjust a flow of meat from the pump to compensate for any variance between the measured weight of the strand and the said predetermined desired weights during the continued operation of the apparatus.

26. The apparatus of claim 25 wherein the co-extruder has a removable discharge nozzle so as to permit the use of a plurality of nozzles of different diameters.

27. The apparatus of claim 25 wherein a linker means is located downstream of the sensor means to form links in the strand after it has been sensed by the sensor means.

28. The apparatus of claim 25 wherein the sensor means is a pair of oppositely disposed laser sensors that project laser beams onto the strand adjacent the discharge end of the conveyor.

29. The apparatus of claim 28 wherein the laser sensors emit planar beams of light towards the strand.

30. The apparatus of claim 28 wherein the laser sensors emit planar beams of light towards the strand to determine the diameter thereof.

* * * * *